US009049186B1

(12) United States Patent
Paczkowski et al.

(10) Patent No.: US 9,049,186 B1
(45) Date of Patent: Jun. 2, 2015

(54) TRUSTED SECURITY ZONE RE-PROVISIONING AND RE-USE CAPABILITY FOR REFURBISHED MOBILE DEVICES

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/831,486

(22) Filed: Mar. 14, 2013

(51) Int. Cl.
*G06F 7/04* (2006.01)
*H04L 29/06* (2006.01)

(52) U.S. Cl.
CPC ..................................... *H04L 63/08* (2013.01)

(58) Field of Classification Search
CPC ............ G06F 21/62; H04L 9/006; H04L 9/08
USPC .............. 713/163, 166; 726/3, 4, 28; 380/277
See application file for complete search history.

(56) References Cited

U.S. PATENT DOCUMENTS

| 5,303,378 | A | 4/1994 | Cohen |
| 6,131,024 | A | 10/2000 | Boltz |
| 6,219,712 | B1 | 4/2001 | Mann et al. |
| 6,668,322 | B1 | 12/2003 | Wood et al. |
| 6,823,454 | B1 | 11/2004 | Hind et al. |
| 6,824,064 | B2 | 11/2004 | Guthery et al. |
| 6,895,234 | B1 | 5/2005 | Laursen et al. |
| 7,387,240 | B2 * | 6/2008 | Ziegler .......................... 235/382 |
| 7,552,467 | B2 * | 6/2009 | Lindsay ............................ 726/5 |
| 7,650,645 | B1 | 1/2010 | Langendorf et al. |
| 7,873,837 | B1 | 1/2011 | Lee et al. |
| 7,895,642 | B1 | 2/2011 | Larson et al. |
| 7,921,303 | B2 * | 4/2011 | Mauro, II ...................... 713/193 |
| 8,060,449 | B1 | 11/2011 | Zhu |

(Continued)

FOREIGN PATENT DOCUMENTS

| WO | WO2011025433 A1 | 3/2011 |
| WO | 2013170228 A2 | 11/2013 |

(Continued)

OTHER PUBLICATIONS

Adrian Perrig, SPINS Security Protocols for sensor networks, Sep. 2002, ACM, vol. 8, pp. 521-534.*

(Continued)

*Primary Examiner* — Dede Zecher
*Assistant Examiner* — Viral Lakhia

(57) ABSTRACT

Embodiments relate generally to systems and methods for generating and using user specific keys to execute one or more secure application in a trusted security zone of a mobile device. The user specific keys may be used in place of a trusted security zone master key and may be generated based on the trusted security zone master key. The trusted security zone master key and the user specific keys may be stored in the trusted security zone. A trusted security zone key may be used to verify the identity of a user and/or mobile device when executing in the trusted security zone. It may be tied to a particular user and may be known by a trusted service manager in communication with the mobile device.

13 Claims, 7 Drawing Sheets

(56) References Cited

U.S. PATENT DOCUMENTS

| | | | |
|---|---|---|---|
| 8,073,428 B2 * | 12/2011 | Khetawat et al. | 455/411 |
| 8,204,480 B1 | 6/2012 | Lindteigen et al. | |
| 8,238,823 B2 | 8/2012 | Maugars et al. | |
| 8,316,237 B1 * | 11/2012 | Felsher et al. | 713/171 |
| 8,402,543 B1 | 3/2013 | Ranjan et al. | |
| 8,413,229 B2 * | 4/2013 | Mullick et al. | 726/15 |
| 8,429,409 B1 | 4/2013 | Wall et al. | |
| 8,443,420 B2 * | 5/2013 | Brown et al. | 726/3 |
| 8,447,983 B1 * | 5/2013 | Beck et al. | 713/172 |
| 8,494,576 B1 | 7/2013 | Bye et al. | |
| 8,504,097 B1 | 8/2013 | Cope et al. | |
| 8,631,247 B2 | 1/2014 | O'Loughlin et al. | |
| 8,632,000 B2 | 1/2014 | Laracey | |
| 8,649,770 B1 | 2/2014 | Cope et al. | |
| 8,667,607 B2 | 3/2014 | Paczkowski et al. | |
| 8,707,056 B2 | 4/2014 | Felton | |
| 8,712,407 B1 | 4/2014 | Cope et al. | |
| 8,726,343 B1 | 5/2014 | Borzycki et al. | |
| 8,738,333 B1 | 5/2014 | Behera et al. | |
| 8,750,839 B1 | 6/2014 | Paczkowski et al. | |
| 8,752,140 B1 | 6/2014 | Paczkowski et al. | |
| 8,762,298 B1 | 6/2014 | Ranjan et al. | |
| 8,793,808 B2 * | 7/2014 | Boccon-Gibod | 726/30 |
| 8,839,460 B2 | 9/2014 | Shirlen et al. | |
| 8,850,568 B2 | 9/2014 | Shirlen et al. | |
| 8,856,600 B2 | 10/2014 | Zadigian et al. | |
| 8,862,181 B1 | 10/2014 | Cope et al. | |
| 8,863,252 B1 | 10/2014 | Katzer et al. | |
| 8,881,977 B1 | 11/2014 | Paczkowski et al. | |
| 2002/0095389 A1 | 7/2002 | Gaines | |
| 2002/0156911 A1 | 10/2002 | Croman et al. | |
| 2002/0174344 A1 | 11/2002 | Ting | |
| 2002/0181503 A1 | 12/2002 | Montgomery, Jr. | |
| 2002/0184325 A1 | 12/2002 | Killcommons et al. | |
| 2002/0194361 A1 | 12/2002 | Itoh et al. | |
| 2002/0194496 A1 | 12/2002 | Griffin et al. | |
| 2003/0126225 A1 | 7/2003 | Camble et al. | |
| 2003/0237002 A1 | 12/2003 | Oishi et al. | |
| 2004/0158840 A1 | 8/2004 | Rothman et al. | |
| 2004/0202328 A1 | 10/2004 | Hara | |
| 2004/0233844 A1 | 11/2004 | Yu et al. | |
| 2004/0234049 A1 | 11/2004 | Melideo | |
| 2004/0243810 A1 | 12/2004 | Rindborg et al. | |
| 2005/0015601 A1 | 1/2005 | Tabi | |
| 2005/0052994 A1 | 3/2005 | Lee | |
| 2005/0091505 A1 | 4/2005 | Riley et al. | |
| 2005/0138433 A1 | 6/2005 | Linetsky | |
| 2005/0235166 A1 | 10/2005 | England et al. | |
| 2005/0239481 A1 | 10/2005 | Seligmann | |
| 2005/0289355 A1 | 12/2005 | Kitariev et al. | |
| 2006/0036851 A1 | 2/2006 | DeTreville | |
| 2006/0156026 A1 * | 7/2006 | Utin | 713/183 |
| 2006/0190605 A1 | 8/2006 | Franz et al. | |
| 2006/0212853 A1 | 9/2006 | Sutardja | |
| 2006/0224901 A1 | 10/2006 | Lowe | |
| 2006/0245438 A1 | 11/2006 | Sajassi et al. | |
| 2006/0259790 A1 | 11/2006 | Asokan et al. | |
| 2006/0261949 A1 | 11/2006 | Kim et al. | |
| 2006/0277307 A1 | 12/2006 | Bernardin et al. | |
| 2006/0277433 A1 | 12/2006 | Largman et al. | |
| 2007/0011061 A1 | 1/2007 | East | |
| 2007/0038648 A1 | 2/2007 | Chetwood et al. | |
| 2007/0061535 A1 | 3/2007 | Xu et al. | |
| 2007/0078988 A1 | 4/2007 | Miloushev et al. | |
| 2007/0079120 A1 * | 4/2007 | Bade et al. | 713/166 |
| 2007/0094273 A1 | 4/2007 | Fritsch et al. | |
| 2007/0094691 A1 | 4/2007 | Gazdzinski | |
| 2007/0162759 A1 | 7/2007 | Buskey et al. | |
| 2007/0177771 A1 | 8/2007 | Tanaka et al. | |
| 2007/0180120 A1 | 8/2007 | Bainbridge et al. | |
| 2007/0186212 A1 | 8/2007 | Mazzaferri et al. | |
| 2007/0197261 A1 | 8/2007 | Humbel | |
| 2007/0214332 A1 | 9/2007 | Sonoda et al. | |
| 2007/0276969 A1 | 11/2007 | Bressy et al. | |
| 2007/0277223 A1 | 11/2007 | Datta et al. | |
| 2008/0014867 A1 | 1/2008 | Finn | |
| 2008/0022374 A1 | 1/2008 | Brown et al. | |
| 2008/0092213 A1 | 4/2008 | Wei et al. | |
| 2008/0097793 A1 | 4/2008 | Dicks et al. | |
| 2008/0121687 A1 | 5/2008 | Buhot | |
| 2008/0159129 A1 | 7/2008 | Songhurst et al. | |
| 2008/0159131 A1 | 7/2008 | Hoeflin et al. | |
| 2008/0162361 A1 | 7/2008 | Sklovsky | |
| 2008/0176538 A1 | 7/2008 | Terrill et al. | |
| 2008/0188178 A1 | 8/2008 | Maugars et al. | |
| 2008/0201212 A1 | 8/2008 | Hammad et al. | |
| 2008/0201578 A1 | 8/2008 | Drake | |
| 2008/0212503 A1 | 9/2008 | Lipford et al. | |
| 2008/0244758 A1 | 10/2008 | Sahita et al. | |
| 2009/0047923 A1 | 2/2009 | Jain et al. | |
| 2009/0055278 A1 | 2/2009 | Nemani | |
| 2009/0070272 A1 | 3/2009 | Jain | |
| 2009/0089449 A1 | 4/2009 | Day | |
| 2009/0113425 A1 | 4/2009 | Ports et al. | |
| 2009/0147958 A1 * | 6/2009 | Calcaterra et al. | 380/260 |
| 2009/0154348 A1 | 6/2009 | Newman | |
| 2009/0182634 A1 | 7/2009 | Park et al. | |
| 2009/0193491 A1 | 7/2009 | Rao | |
| 2009/0271321 A1 * | 10/2009 | Stafford | 705/71 |
| 2009/0281947 A1 | 11/2009 | Erel | |
| 2009/0300599 A1 | 12/2009 | Piotrowski | |
| 2009/0320028 A1 | 12/2009 | Gellerich et al. | |
| 2010/0031325 A1 * | 2/2010 | Maigne et al. | 726/4 |
| 2010/0052844 A1 | 3/2010 | Wesby | |
| 2010/0077487 A1 | 3/2010 | Travis et al. | |
| 2010/0082977 A1 | 4/2010 | Boyle et al. | |
| 2010/0125904 A1 | 5/2010 | Nice et al. | |
| 2010/0128598 A1 | 5/2010 | Gandhewar et al. | |
| 2010/0130170 A1 | 5/2010 | Liu et al. | |
| 2010/0142517 A1 | 6/2010 | Montemurro et al. | |
| 2010/0146589 A1 | 6/2010 | Safa | |
| 2010/0153721 A1 * | 6/2010 | Mellqvist | 713/168 |
| 2010/0162028 A1 | 6/2010 | Frank et al. | |
| 2010/0198943 A1 | 8/2010 | Harrang et al. | |
| 2010/0223348 A1 | 9/2010 | Przybysz et al. | |
| 2010/0228937 A1 | 9/2010 | Bae et al. | |
| 2010/0241847 A1 | 9/2010 | van der Horst et al. | |
| 2010/0246818 A1 * | 9/2010 | Yao | 380/44 |
| 2010/0269156 A1 | 10/2010 | Hohlfeld et al. | |
| 2010/0274726 A1 | 10/2010 | Florek et al. | |
| 2010/0281139 A1 | 11/2010 | Deprun | |
| 2010/0299313 A1 | 11/2010 | Orsini et al. | |
| 2010/0306353 A1 | 12/2010 | Briscoe et al. | |
| 2010/0318802 A1 | 12/2010 | Balakrishnan | |
| 2010/0328064 A1 | 12/2010 | Rogel | |
| 2011/0010720 A1 | 1/2011 | Smith et al. | |
| 2011/0014948 A1 | 1/2011 | Yeh | |
| 2011/0021175 A1 | 1/2011 | Florek et al. | |
| 2011/0035604 A1 | 2/2011 | Habraken | |
| 2011/0055084 A1 | 3/2011 | Singh | |
| 2011/0078081 A1 | 3/2011 | Pirzadeh et al. | |
| 2011/0082711 A1 | 4/2011 | Poeze et al. | |
| 2011/0112968 A1 | 5/2011 | Florek et al. | |
| 2011/0113479 A1 | 5/2011 | Ganem | |
| 2011/0154032 A1 * | 6/2011 | Mauro, II | 713/165 |
| 2011/0166883 A1 | 7/2011 | Palmer et al. | |
| 2011/0202916 A1 | 8/2011 | VoBa et al. | |
| 2011/0212707 A1 | 9/2011 | Mahalal | |
| 2011/0216701 A1 | 9/2011 | Patel et al. | |
| 2011/0226853 A1 | 9/2011 | Soh et al. | |
| 2011/0237190 A1 | 9/2011 | Jolivet | |
| 2011/0238573 A1 | 9/2011 | Varadarajan | |
| 2011/0238992 A1 * | 9/2011 | Jancula et al. | 713/168 |
| 2011/0246609 A1 | 10/2011 | Kim | |
| 2011/0251892 A1 | 10/2011 | Laracey | |
| 2011/0258462 A1 | 10/2011 | Robertson et al. | |
| 2011/0281558 A1 | 11/2011 | Winter | |
| 2011/0294418 A1 | 12/2011 | Chen | |
| 2012/0003983 A1 | 1/2012 | Sherlock et al. | |
| 2012/0011572 A1 | 1/2012 | Chew et al. | |
| 2012/0021683 A1 | 1/2012 | Ma et al. | |
| 2012/0023583 A1 | 1/2012 | Sallam | |
| 2012/0028575 A1 | 2/2012 | Chen et al. | |
| 2012/0029997 A1 | 2/2012 | Khan et al. | |

(56) References Cited

U.S. PATENT DOCUMENTS

| | | |
|---|---|---|
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137119 A1 | 5/2012 | Doerr et al. |
| 2012/0143703 A1 | 6/2012 | Wall et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0266076 A1 | 10/2012 | Lockhart et al. |
| 2012/0266220 A1* | 10/2012 | Brudnicki et al. ............... 726/6 |
| 2012/0272306 A1 | 10/2012 | Benaloh et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1* | 3/2013 | Hawkes et al. ............... 726/7 |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1* | 6/2013 | Mendel et al. ............... 726/4 |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0212704 A1* | 8/2013 | Shablygin et al. ............... 726/28 |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0345530 A1 | 12/2013 | McRoberts et al. |
| 2013/0347103 A1 | 12/2013 | Veteikis et al. |
| 2014/0033316 A1 | 1/2014 | Paczkowski et al. |
| 2014/0047548 A1 | 2/2014 | Bye et al. |
| 2014/0074508 A1 | 3/2014 | Ying et al. |
| 2014/0188738 A1* | 7/2014 | Huxham ............... 705/73 |
| 2014/0245444 A1 | 8/2014 | Lutas et al. |
| 2014/0281544 A1 | 9/2014 | Paczkowski et al. |

FOREIGN PATENT DOCUMENTS

| | | | |
|---|---|---|---|
| WO | 2014004590 | A2 | 1/2014 |
| WO | 2014018575 | A2 | 1/2014 |
| WO | 2014025687 | A2 | 2/2014 |
| WO | WO2014158431 | A1 | 10/2014 |

OTHER PUBLICATIONS

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

Final Office Action dated Feb. 1, 2013, U.S. Appl. No. 12/486,873, filed Jun. 18, 2009.

Cope, Warren B., et al., "Electronic Purchase Transaction Trust Infrastructure", filed May 29, 2012, U.S. Appl. No. 13/482,731.

Cope, Warren B., et al., "Alternative hardware and Software Configuration for Near Field Communication", filed May 4, 2012, U.S. Appl. No. 13/463,797.

Cope, Warren B., et al., "Multiple Secure Elements in Mobile Electronic Device with Near Field Communication Capability", filed Apr. 5, 2012, U.S. Appl. No. 13/440,980.

Bye, Stephen James, et al., "Near Field Communication Authentication and Validation to Access Corporate Data", filed May 3, 2012, U.S. Appl. No. 13/463,801.

Katzer, Robin D., et al., "Web Server Bypass of Backend Process on Near Field Communications and Secure Elements Chips", filed May 11, 2012, U.S. Appl. No. 13/470,203.

Katzer, Robin D., et al., "Web Server Bypass of Backend Process on Near Field Communications and Secure Elements Chips", filed May 10, 2013, PCT Application No. PCT/US13/40673.

Katzer, Robin D., et al., "Secure Placement of Centralized Media Controller Application in Mobile Access Terminal ", filed Nov. 11, 2011, U.S. Appl. No. 13/294,177.

McRoberts, Leo Michael, et al., "End-to-End Trusted Communications Infrastructure", filed Jun. 25, 2012, U.S. Appl. No. 13/532,588.

McRoberts, Leo Michael, et al., "End-to-End Trusted Communications Infrastructure", filed on Jun. 25, 2013, PCT Serial No. PCT/US13/47729.

Paczkowski, Lyle W., et al., "Trusted Policy and Charging Enforcement Function", filed Jun. 27, 2012, U.S. Appl. No. 13/533,969.

Bye, Stephen James, et al., "Systems and Methods for Provisioning and Using Multiple Trusted Security Zones on an Electronic Device", filed Aug. 10, 2012, U.S. Appl. No. 13/571,348.

Bye, Stephen James, et al., "Systems and Methods for Provisioning and Using Multiple Trusted Security Zones on an Electronic Device", filed on Aug. 5, 2013, PCT Serial No. PCT/US13/53617.

Bye, Stephen James, et al., "Trusted Signaling in Long Term Evolution (LTE) 4G Wireless Communication", filed Feb. 7, 2013, U.S. Appl. No. 13/762,319.

Cope, Warren B., et al., "Extended Trusted Security Zone Radio Modem", filed Jul. 2, 2012, U.S. Appl. No. 13/540,437.

(56) References Cited

OTHER PUBLICATIONS

Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.

(56) References Cited

OTHER PUBLICATIONS

Bertz, Lyle T., et al., "Framework for Real-Time Brokering of Digital Content Delivery," filed Aug. 25, 2012, U.S. Appl. No. 13/594,777.

Bertz, Lyle T., et al.,"Reservations in Real-Time Brokering of Digital Content Delivery," filed Aug. 25, 2012, U.S. Appl. No. 13/594,778.

Bertz, Lyle T., et al., "File Retrieval in Real-Time Brokering of Digital Content Delivery," filed Aug. 25, 2012, U.S. Appl. No. 13/594,779.

Paczkowski, Lyle W., et al., "Trusted Security Zone Watermark", filed Mar. 5, 2013, U.S. Appl. No. 13/786,450.

Paczkowski, Lyle W., et al., "Trusted Processing Location Within a Graphics Processing Unit", filed Jul. 10, 2013, U.S. Appl. No. 13/939,175.

McCracken, Billy Gene, Jr., et al. "Mobile Communication Device Profound Identity Brokering Framework", filed Jun. 6, 2013, U.S. Appl. No. 13/912,190.

Urbanek, Robert E., Subscriber Identity Module Virtualization:, filed Nov. 20, 2013, U.S. Appl. No. 14/085,474.

Krieger, Michael D., et al., "Billing Varied Service Based on Tier", filed on Nov. 8, 2013, U.S. Appl. No. 14/075,663.

Paczkowski, Lyle W., et al., "Trusted Display and Transmission of Digital Ticket Documentation", filed Jan. 24, 2014, U.S. Appl. No. 14/163,047.

Loman, Clint H., et al., "Verification of Mobile Device Integrity During Activation", filed Mar. 28, 2014, U.S. Appl. No. 14/229,532.

Paczkowski, Lyle W., et al., "Network Based Temporary Trust Extension to a Remote or Mobile Device Enabled via Specialized Cloud Services", filed Jul. 29, 2014, U.S. Appl. No. 14/446,330.

Cordes, Kevin R., et al., "Digest of Biographical Information for an Electronic Device with Static and Dynamic Portions", filed Apr. 4, 2013, U.S. Appl. No. 13/857,141.

Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.

Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.

Ahmed, Farid, et al., "Correlation-based Watermarking Method for Imagine Authentication Applications", Society of Photo-Optical Instrumentation Engineers, Feb. 17, 2004, pp. 1834-1838.

Office Action dated Aug. 29, 2014, U.S. Appl. No. 13/470,203, filed May 11, 2012.

Notice of Allowance dated Oct. 8, 2014, U.S. Appl. No. 13/294,177, filed Nov. 11, 2011.

FAIPP Pre-Interview Communication dated Sep. 25, 2014, U.S. Appl. No. 13/533,969, filed Jun. 27, 2012.

Notice of Allowance dated Oct. 6, 2014, U.S. Appl. No. 13/844,357, filed Mar. 15, 2013.

FAIPP Pre-Interview Communication dated Nov. 12, 2014, U.S. Appl. No. 13/844,145, filed Mar. 15, 2013.

Notice of Allowance dated Sep. 19, 2014, U.S. Appl. No. 13/594,778, filed Aug. 25, 2012.

Final Office Action dated Nov. 7, 2014, U.S. Appl. No. 13/786,450, filed Mar. 5, 2013.

FAIPP Pre-Interview Communication dated Nov. 7, 2014, U.S. Appl. No. 13/802,404, filed Mar. 13, 2013.

FAIPP Pre-Interview Communication dated Oct. 29, 2014, U.S. Appl. No. 13/844,282, filed Mar. 15, 2013.

FAIPP Pre-Interview Communication dated Oct. 21, 2014, U.S. Appl. No. 13/844,325, filed Mar. 15, 2013.

Foreign Communication from a Related Counterpart—International Preliminary Report on Patentability, dated Nov. 20, 2014, PCT/US13/40673, filed on May 10, 2013.

Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.

Lee, Jeremy, et al., "A Low-Cost Solution for Protecting IPs Against Scan-Based Side Channel Attacks," 24th IEEE VLSIS Test Symposium. Pub. Date: 2006. http//ieeexplore.ieee.org/stamp/stamp.jsp?tp=&arnumber=1617569.

\* cited by examiner

TRUSTED SECURITY ZONE RE-PROVISIONING AND RE-USE CAPABILITY FOR REFURBISHED MOBILE DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example media files, electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information.

SUMMARY

In an embodiment, a method for creating a user specific trusted security zone key on a mobile device is disclosed. The method comprises: receiving user input information; hashing the user input information with a trusted security zone master key to generate a user specific trusted security zone key; communicating the user input information to a trusted service manager; verifying the user specific trusted security zone key between the mobile device and the trusted service manager; and using the user specific trusted security zone key to operate one or more secure applications on the mobile device.

In an embodiment, a method for creating a user specific trusted security zone key during the initial set-up of a mobile device is disclosed. The method comprises: receiving a user input information to a mobile device comprising a trusted security zone; hashing the user input information with the trusted security zone master key to generate a user specific trusted security zone key, wherein the hashing process is completed by a set-up application on the mobile device; communicating the user input information to a trusted service manager, wherein the trusted service manager has access to the trusted security zone master key and the trusted service manager completes a similar hashing process to generate the user specific trusted security zone key; verifying the user specific trusted security zone key between the mobile device and the trusted service manager, wherein the device and TSM communicate via a service provider network; and using the user specific trusted security zone key to operate one or more secure applications executed in trust-zone on the mobile device.

In an embodiment, a method for creating a user specific trusted security zone key for use on a mobile device is disclosed. The method comprises: receiving a user input information via a mobile device in communication with a network server, wherein the mobile device comprises a trusted security zone; generating a first user specific trusted security zone key by hashing the user input information with a trusted security zone master key, wherein the hashing process is completed by an application on the network server; and using the first user specific trusted security zone key to operate secure applications executed in the trusted security zone of the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
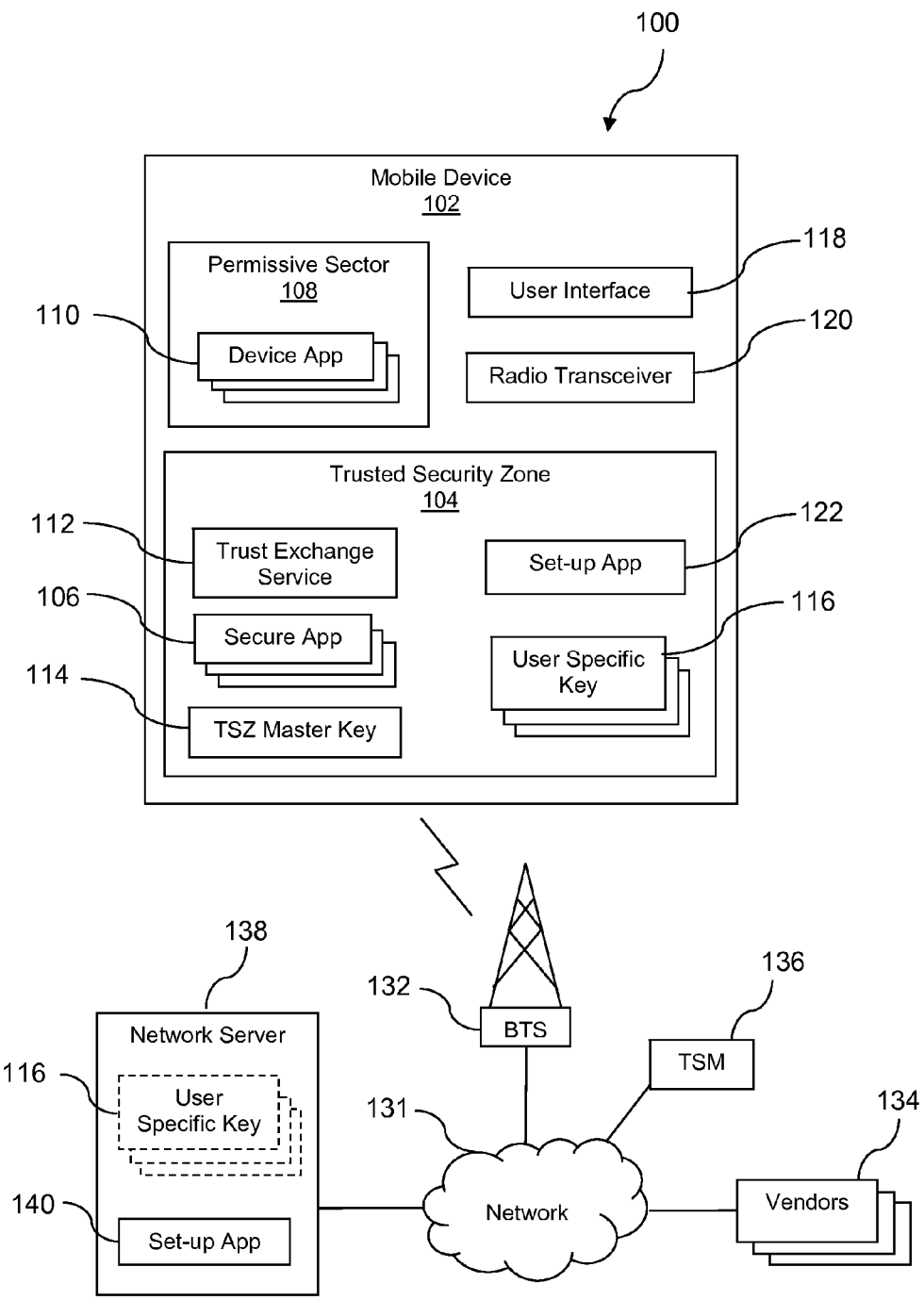
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for generating and using user specific keys to access a trusted security zone of a mobile device. Accessing the trusted security zone may comprise one or more of the following: operating one or more secure applications on the mobile device; reading data from the trusted security zone; writing data to the trusted security zone; and accessing one or more keys in the trusted security zone. The user specific keys may be used in place of a trusted security zone master key and may be generated based on the trusted security zone master key. The trusted security zone master key and the user specific keys may be stored in or provisioned to the trusted security zone. A trusted security zone key may be used to verify the identity of a user and/or mobile device when executing in the trusted security zone. It may be tied to a particular user and may be known by a trusted service manager in communication with the mobile device.

Throughout the lifespan of a mobile device, it may be refurbished or reused and may be passed from one user to the next. For example, a first user may wish to change devices, such as for an upgrade, and may surrender the first device back to the provider of the device. The provider may then refurbish the device so that it may be resold or reissued to a second user. The refurbish process may include returning the device to factory settings. In the case where the mobile device comprises a trusted security zone, a second user may not be able to access the trusted security zone or applications executed in the trusted security zone, because it would have already been personalized by the first user. The personalization process may include associating the trusted security zone master key with the first user of the device. Therefore, it may be desired to alter the personalization process of the trusted security zone such that multiple users may be able to access and execute in the trusted security zone of a mobile device.

This may be accomplished by generating multiple user specific trusted security zone keys which may be used in place of the trusted security zone master key. For example, the trusted security zone master key may be hashed with user specific information or user input information to generate a new user specific trusted security zone key. The hashing may be completed using a one-way secure cryptographic hash function, for instance one of MD5, SHA-0, SHA-1, SHA-2, SHA-3, or other well-known one-way secure cryptographic hash functions. Herein after a one-way secure cryptographic hash function may be referred to more concisely as a hash function or a hashing function. The use of a one-way secure hash function may prevent the determination of the trusted security zone master key and/or the user specific key by outside entities. The user specific key may not be determined from the master key by a deterministic algorithm, because of the hashing operation that employs not only the master key but also some information contributed by the user or specific to the user. Likewise, the master key may not be determined from a user specific key by a deterministic algorithm. Additionally, a first user specific key generated based on the master key may not be determined from a second user specific key generated from the same master key by a deterministic algorithm.

The user specific keys may be generated by an application on the mobile device or an application on a network server in communication with the mobile device. The user specific key may be associated with a user of the mobile device and may be used to verify the identity of the user and/or mobile device when executing secure applications in the trusted security zone. Then, if the device is returned to factory settings, the personalization process may be repeated, and a second user specific trusted security zone key may be generated and used by a second user of the mobile device.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the communication system 100 comprises a mobile device 102 comprising a trusted security zone 104, a permissive sector 108, a cellular radio transceiver 120, and an optional user interface 118. In an embodiment, the trusted security zone 104 comprises one or more secure applications 106. The permissive sector 108 may comprise one or more device applications 110. The mobile device 102 may engage in a variety of communication exchanges. The mobile device 102 may comprise a variety of devices such as a mobile phone, a personal digital assistant (PDA), a media player, a laptop computer, a tablet computer, and other electronic devices having a macro cellular radio transceiver.

As described above, the trusted security zone 104 may be provided by a physically separate processor or by a virtual processor. The one or more secure applications 106 may be any of a variety of applications that process and/or transmit confidential information. The confidential information may comprise sensitive business documents such as electronic mail, marketing literature, business plans, client lists, addresses, employee data, intellectual property documents, and the like. The confidential information may comprise personal medical records or medical data that are subject to privacy requirements enforced by government regulatory bodies or commercial standards. The confidential information may comprise financial information such as account numbers, authentication identities, account balance information, and the like.

When processing and/or transmitting the confidential information, the secure application 106 executes at least partially in the trusted security zone 104. It is a characteristic or feature of the trusted security zone 104, as described more fully above, that when a secure application 106 executes in the trusted security zone 104, untrusted applications are prevented from executing and/or accessing trusted memory partitions and/or accessing the display, communication interfaces, or input devices of the mobile device 102, thereby reducing the opportunity for malware that may have infiltrated the mobile device 102 to corrupt or to monitor the confidential information.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile device 102 may couple to the network 131 by a variety of communication paths. The mobile device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. The wireless link between the mobile device 102 and the base transceiver station 132 may couple the mobile device 102 to the network 131.

In an embodiment, the trusted security zone 104 may be provided in a secure area of a processor and/or memory chip shared with the permissive sector 108 or in a separate processor and/or memory chip. The trusted security zone 104 may be provided as what may be conceptualized as "invisible space." In an embodiment, at least some of the memory addresses occupied by the trusted security zone 104 may be inaccessible to device applications 110 executing out of permissive sector 108. This demarcation of accessible memory addresses versus inaccessible memory addresses may be provided by the operating system of the mobile device 102. In an embodiment, the trusted security zone 104 may encapsulate a trusted execution environment (TEE), for example conforming at least partially to the Global Platform 2.0 or later revision trusted execution environment standard. It is understood, however, that the trusted security zone 104 is contemplated to provide further functionality than that envisioned by the trusted execution environment standards.

In an embodiment, a trust exchange service 112 is provided in the trusted security zone 104. The trust exchange service 112 may be conceptualized as bridging between the permissive sector 108 and the trusted security zone 104. The trust exchange service 112 promotes secure interactions between the applications executing in the permissive sector 108 and applications executing in the trusted security zone 104. The security may be provided using one or more techniques. For example, the trust exchange service 112 may pause a plurality of execution threads when initiating an interaction with the trusted security zone 104, for example while handling a request for service from the centralized media controller application 106. This feature may reduce the opportunity that other threads may sniff or otherwise seek to intrude on the operation. For example, the trust exchange service 112 may impose a criteria that all communication between the permissive sector 108 and the trusted security zone 104 be conducted using data that is transformed according to protocols of the trusted security zone 104, for example using encryption and/or using hashing. The trust exchange service 112 may also hide address space in the trusted security zone 104 and/or make the address space inaccessible to the permissive sector 108 without the mediation of the trust exchange service 112.

The device applications 110 executed in the permissive sector 108 may be any of a variety of applications. One of the device applications 110 may be a telephone application that receives dialed digits and attempts to originate a voice call—for example a voice over IP (VoIP) call—to a called telephone. One of the device applications 110 may be a web browser application that requests content from the network 131, for example by sending out a hypertext transport protocol (HTTP) message embedding a universal reference locator (URL). One of the device applications 110 may be a media player that requests streaming media from the network 131. Many of the device applications 110 may depend upon communication service provided by an IMS network to deliver their functionality to an end user of the mobile device 102. One of the device applications 110 may comprise a mobile transaction interface, where a user may complete a purchase using the application, and secure information, such as credit card and/or bank information, may be communicated through the application.

The user interface 118 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, or phone call audio) to a user of the mobile device 102. The microphone may receive voice and/or audio from a user and/or communicate audio to a user. In an embodiment, a user may utilize the user interface 118 to communicate with the mobile device 102, for example, to initiate the execution of a device application 110 and/or a secure application 106. Additionally, a user may receive communication from the mobile device 102 via the user interface 118, such as messages, emails, contact information, caller identification, call history, internet access, etc. A user may additionally employ the user interface 118 for viewing and/or listening to media such as music, movies, shows, videos, photos, games etc.

In an embodiment, the trusted security zone 104 may comprise a trusted security zone master key 114, wherein the master key 114 may serve to verify the identity of the mobile device 102 (or user of the mobile device 102) when executing secure applications 106. For example, when a secure application 106 is first executed by a mobile device 102, the master key 114 may be verified by a trusted service manager (TSM) 136 before any confidential information is shared or communicated to the secure application 106. In a personalization process, the master key 114 may be associated with or assigned to a user of the mobile device 102. The master key 114 may comprise a set of numbers, letters, and/or symbols unique to the mobile device 102. Additionally, the master key 114 may be known by the trusted service manager 136, wherein the master key 114 may be communicated to the trusted service manager 136 before the mobile device 102 is issued to a user and/or put into service, for example. In an embodiment, the master key 114 may be burned to or embedded in the memory of the mobile device 102 during the manufacturing process of the mobile device 102. In an embodiment, the master key 114 may be considered unchanged or unalterable after it has been place on a mobile device 102.

In some embodiments, it may be desired to keep the trusted security zone master key 114 unknown or protected. For example, if the mobile device 102 is transferred from a first user to a second user by sale or gift or exchange through the provider, the second user may not be able to access the trusted security zone 104 of the mobile device 102, because the master key 114 would have already been associated with the first user during the personalization process. In some embodiments, a user specific key 116 may be generated based on the trusted security zone master key 114 as well as personalized user information, wherein the user specific key 116 may be used instead of the master key 114 to verify the identity of the user of the mobile device 102. The user specific key 116 may, in some embodiments, be generated during a set-up or provisioning procedure of the mobile device 102.

As an example, a first user may purchase the mobile device 102 from a service provider, and during the set-up of the device, a first user specific key 116 may be generated and associated with the first user, as described above. The first user may employ the first user specific key 116 when downloading and/or operating secure applications 106 on the mobile device 102. Then, the first user may wish to upgrade to another mobile device and may surrender or trade-in the first mobile device 102 to the service provider. The service provider may clear the device 102 (including the trusted security zone 104) and return the device 102 to factory settings, wherein the first user specific key 116 may or may not be kept after the return to factory settings. Then, the device 102 may be purchased by or issued to a second user, wherein the set-up procedure of the device 102 may be repeated and a second user specific key 116 may be generated and associated with the second user. The second user may employ the second user specific key 116 when downloading and/or operating secure applications 106 on the mobile device 102. The process may be repeated as many times as necessary.

In an embodiment, a set-up application may be operable to generate one or more user specific keys 116. In one embodiment, the set-up application 122 may be a secure application executed in the trusted security zone 104 of the mobile device 102, while in another embodiment, the set-up application 140 may be executed by a network server 138 in communication with the mobile device 102. The set-up application (122 or 140) may be operable to receive the trusted security zone master key 114 information as well as user input personalized information. The user input information may comprise a number, code, or pin input by the user, wherein the code or pin may comprise one or more number, letter, and/or symbol. In other embodiments, the user input information may comprise one of credit card information, birthdate of a user, and/or a user account number issued by the service provider of the mobile device 102. The user specific key 116 may be generated by hashing the trusted security zone master key 114 and the user input information, wherein the hashing may be completed by a set-up application 122 or 140. In an embodiment, the user specific key 116 may be generated by hashing or otherwise processing by a nonreversible algorithm the trust master key 114, at least some of the user input information, and a seed or nonce supplied by the set-up application 122, 140. The user specific key 116 may then be stored in the trusted security zone 104 of the mobile device 102 and/or stored on the network server 138 (shown with a dashed outline).

In an embodiment, the user specific key 116 may be communicated to the trusted service manager (TSM) 136, in order to verify the identity of the user of the mobile device 102. In an embodiment, the user specific key 116 may be generated by the mobile device 102 and stored on the mobile device 102, and then communicated to the trusted service manager 136 via the network 131. In another embodiment, the user specific key 116 may be generated by the network server 138, stored on either the network server 138 or the mobile device 102, and then communicated to the trusted service manager 136, wherein communication between the mobile device 102 and the trusted service manager 136 may be facilitated by the network server 138. The trusted service manager 136 may then facilitate communication between the mobile device 102 and vendors 134, wherein communication with vendors 134 may be executed with a secure application 106.

In an alternative embodiment, the user input information used to generate the user specific key 116 (on either the network server 138 or the mobile device 102) may be communicated to the trusted service manager 136, wherein the trusted service manager 136 may be operable to complete the hash algorithm of the trusted security zone master key 114 and the user specific information to generate the user specific key 116. Then, the trusted service manager 136 may verify the user specific key 116 by communicating with either the network server 138 or the mobile device 102.

In an embodiment, the trusted service manager 136 that communicates with the mobile device 102 and/or network server 138 during the initial set-up or provisioning may be identified, wherein identification information may be communicated to and stored on the network server 138 and/or the mobile device 102. Then, if the mobile device is returned to factory settings and the set-up (or personalization) procedure is repeated, the trusted service manager identification information may be used to ensure communication with the correct trusted service manager 136. Storing the trusted service manager identification information may be desirable because different trusted service managers may comprise differing methods for access protocols to the execution environment. If, for some reason, the original trusted service manager 136 ceases operation between the initial set-up of the mobile device 102 and the next, the network server 138 may use the identification information to reestablish a communication channel by establishing the original protocol completed by proxy.

Figure 2:
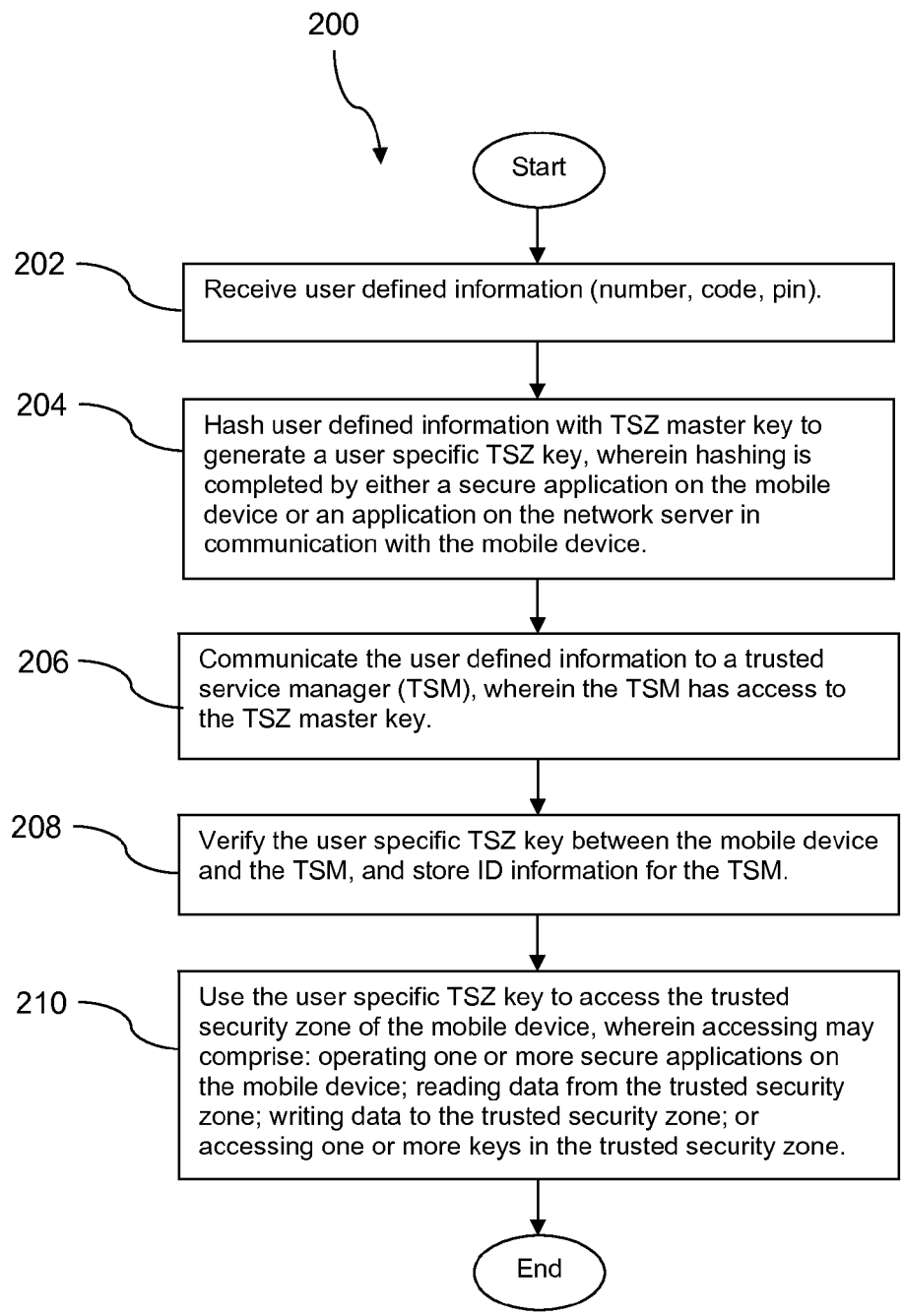
FIG. 2 is a flow chart illustrating a method according to an embodiment of the disclosure.

FIG. 2 illustrates a method 200 for generating and using a user specific trusted security zone key, according to an embodiment of the disclosure. The method 200 comprises, at block 202, receiving user defined information, which may comprise a number, code, pin, set of numbers, birthdate, credit card information, account number, etc. Then, at block 204, the method comprises hashing the user defined information with a trusted security zone master key stored in the trusted security zone of a mobile device. The hashing may generate a user specific trusted security zone key, and the hashing may be completed by either a secure application on the mobile device or an application on the network server in communication with the mobile device. At block 206, the user defined information may be communicated to a trusted service manager (TSM), wherein the trusted service manager has access to the trusted security zone master key. In some embodiments, the trusted service manager may complete a similar hashing process to generate the user specific trusted security zone key. At block 208, the method may comprise verifying the user specific trusted security zone key between the mobile device and the trusted security manager. Additionally, identification information for the trusted service manager may be received and stored by the mobile device and/or the network server. At block 210, the method may comprise using the user specific trusted security zone key to access the trusted security zone of the mobile device. Accessing the trusted security zone may comprise one or more of the following: operating and/or executing one or more secure applications on the mobile device; reading data from the trusted security zone; writing data to the trusted security zone; and accessing one or more keys in the trusted security zone. The one or more secure applications may be executed in the trusted security zone of the mobile device, and may require verification of the user's identity by presentation of the user specific trusted security zone key before operating.

Figure 3:
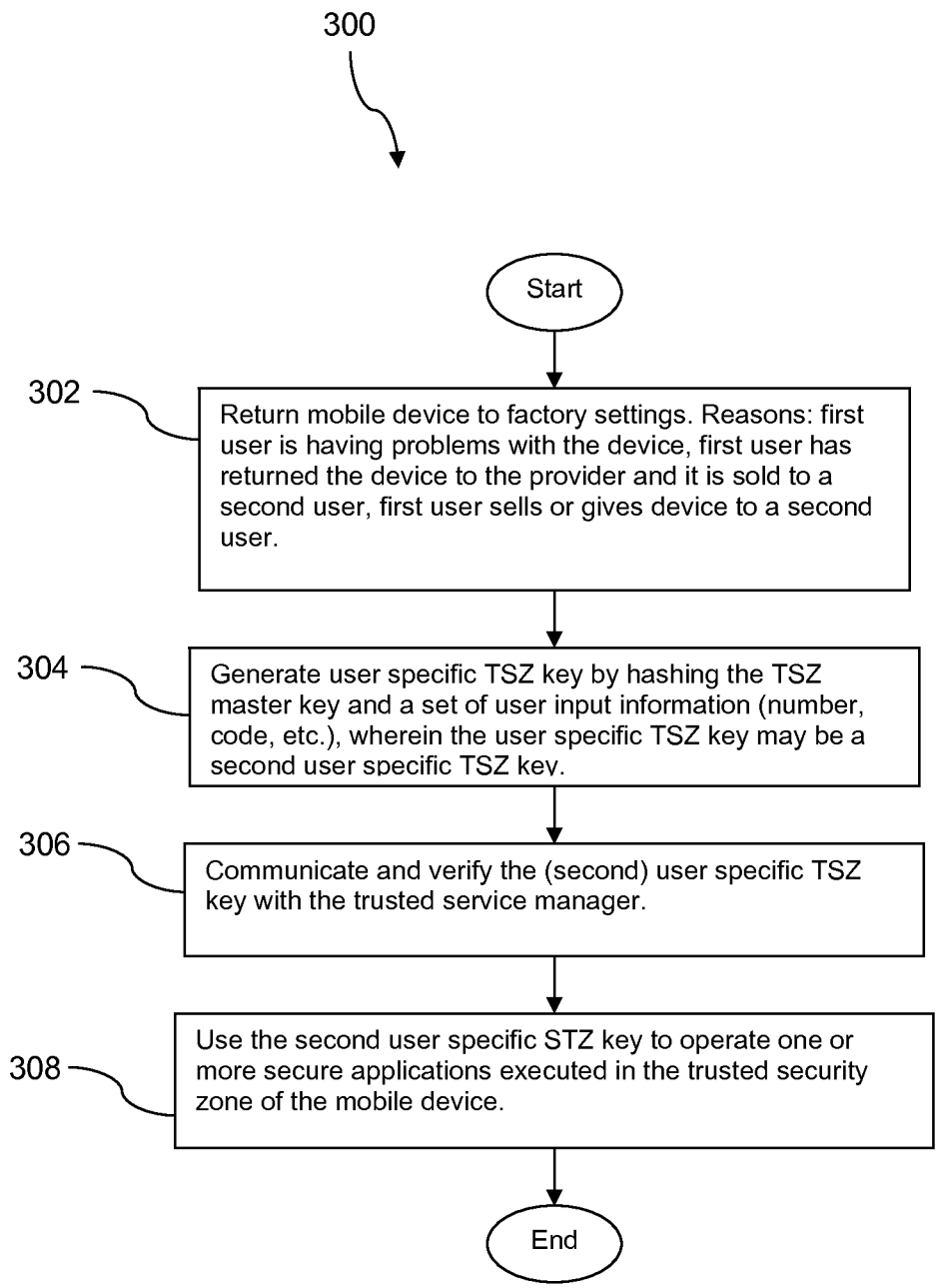
FIG. 3 is a flow chart illustrating another method according to an embodiment of the disclosure.

FIG. 3 illustrates a method 300 for generating and using a user specific trusted security zone key after the mobile device has been returned to factory settings, according to an embodiment of the disclosure. The method 300 comprises, at block 302, returning a mobile device to factory settings, wherein the mobile device comprises a trusted security zone. Returning the device to factory settings might be done for one of the following reasons: the first user of the device is experiencing problems with the device, the first user of the device has returned the device to the provider and the provider wishes to refurbish the device, or the first user of the device wishes to sell or give the device to a second user. After the mobile device has been returned to factory settings, at block 304, the method comprises generating a user specific trusted security zone key by hashing a trusted security zone master key with user input information, wherein the user input information may comprise a number, code, pin, set of numbers, birthdate, credit card information, account number, etc. In some embodiments, this user specific trusted security zone key may be a second user specific trusted security zone key created for the mobile device. Then, at block 306, the method comprises communicating and/or verifying the user specific trusted security zone key with a trusted service manager. At block 308, the method comprises using the user specific trusted security zone key to operate one or more secure applications executed in the trusted security zone of the mobile device. The secure application may verify the user's identity by presentation of the user specific trusted security zone key before operating.

Figure 4:
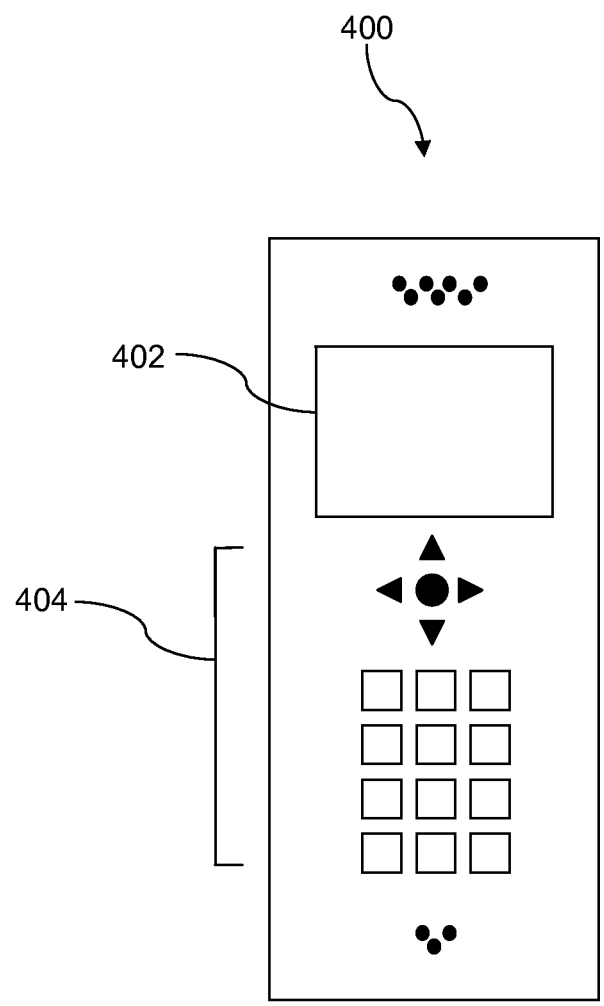
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
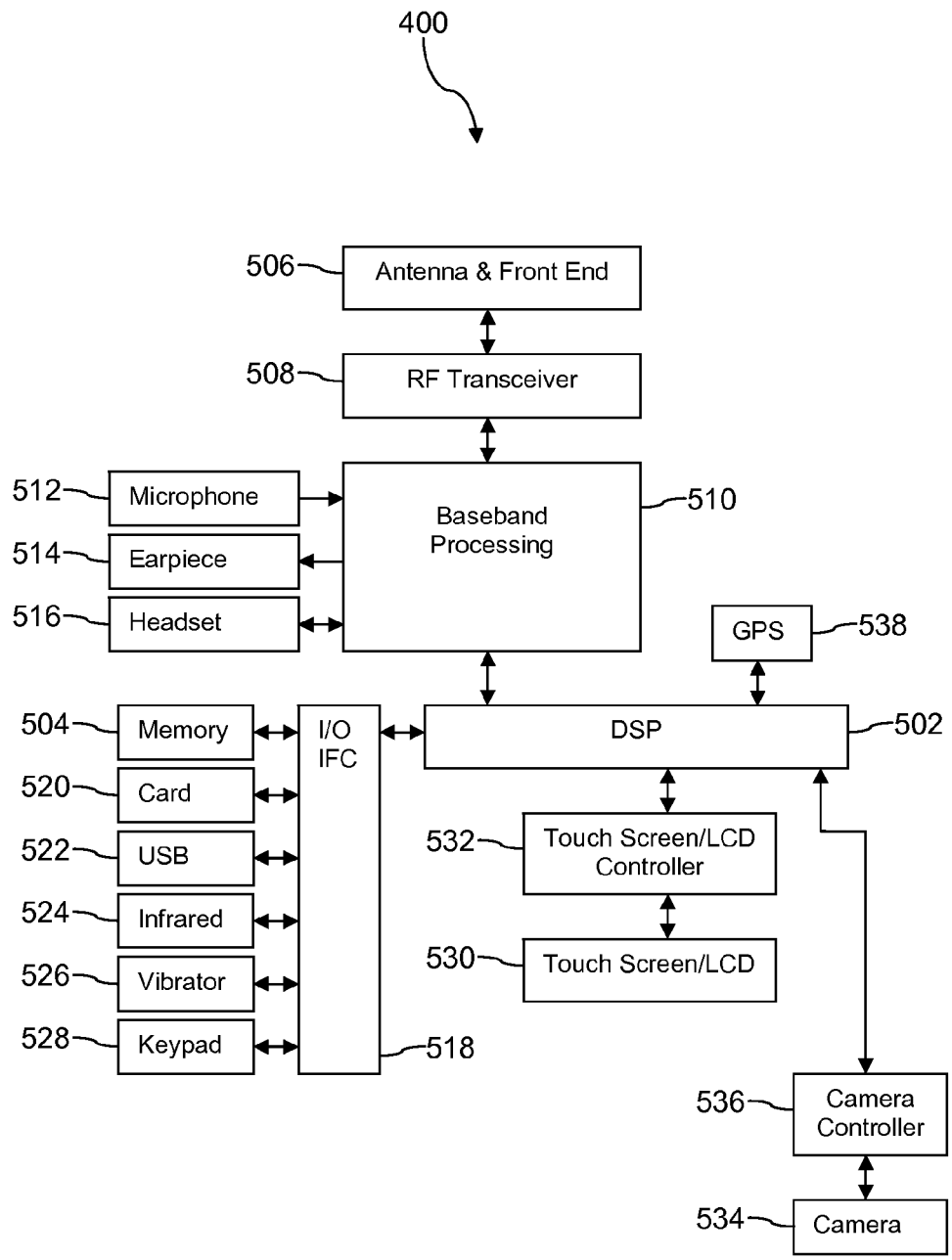
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
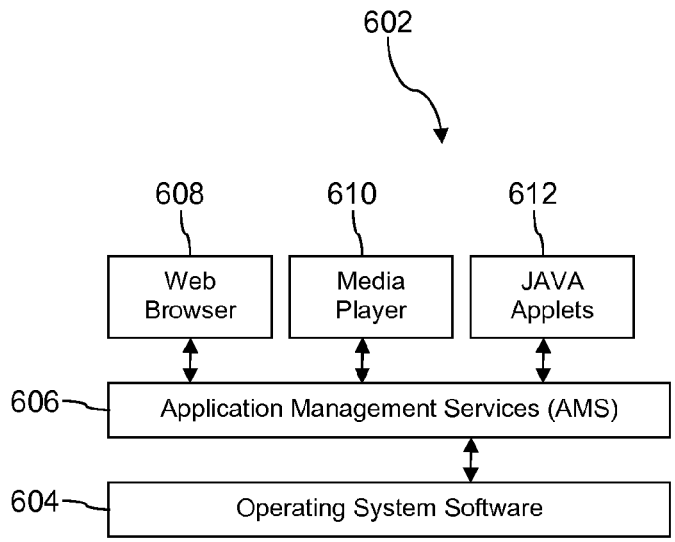
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
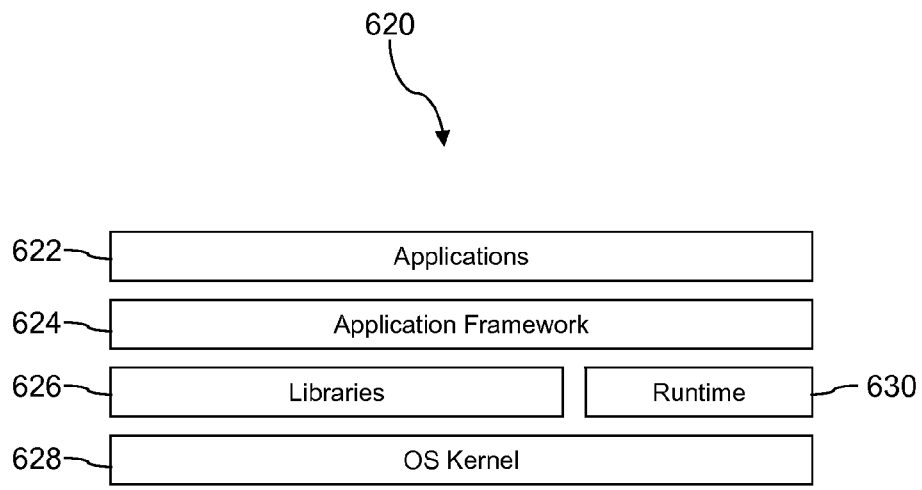
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
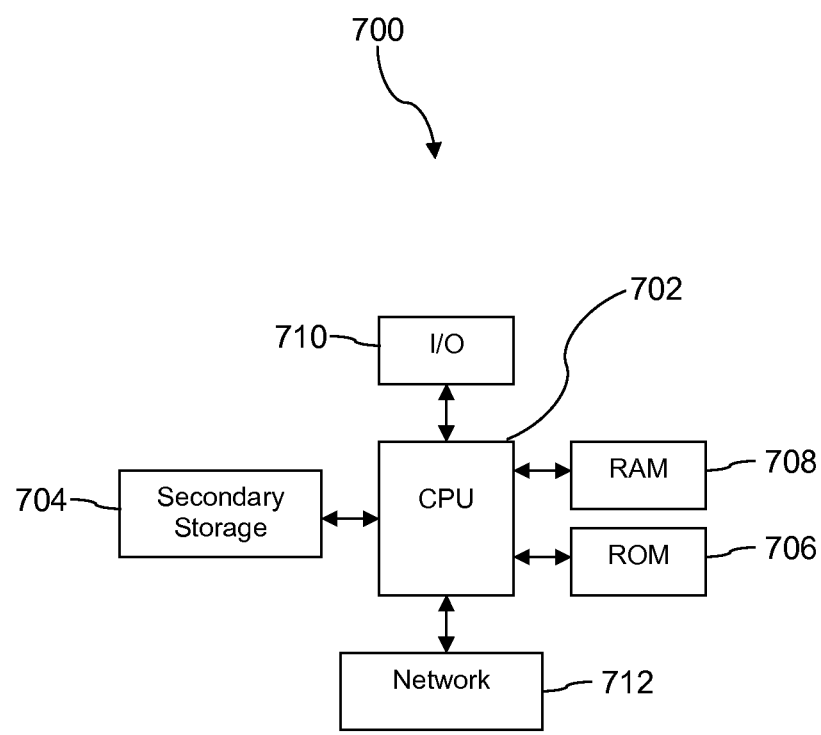
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for creating a user specific trusted security zone key on a mobile device comprising:
    after a mobile device, which was originally used by a first user, has been returned to factory settings because a second user wishes to use the mobile device:
        receiving, user input information;
        hashing, the user input information with a trusted security zone master key to generate a user specific trusted security zone key, wherein the hashing is completed using a one-way secure hash function;
        communicating, the user input information to a trusted service manager;
        verifying, the user specific trusted security zone key between the mobile device and the trusted service manager; and
        using, the user specific trusted security zone key to access a trusted security zone on the mobile device, wherein the first user of the mobile device used the trusted security zone master key when executing in the trusted security zone and the second user uses the user specific trusted security zone key when executing in the trusted security zone.

2. The method of claim 1, wherein the hashing process is completed by a secure application on the mobile device.

3. The method of claim 1, wherein the hashing process is completed by an application on a network server in communication with the mobile device.

4. The method of claim 1, wherein the trusted service manager has access to the trusted security zone master key, and the trusted service manager completes a similar hashing process to generate the user specific trusted security zone key.

5. The method of claim 1, wherein accessing the trusted security zone comprises one or more of the following: operating one or more secure applications on the mobile device; reading data from the trusted security zone; writing data to the trusted security zone; and accessing one or more keys in the trusted security zone.

6. The method of claim 5, wherein the trusted service manager is identified and identification information is stored on the mobile device.

7. The method of claim 6, wherein the identification information is used to ensure communication with the correct trusted service manager.

8. A method for creating a user specific trusted security zone key during the initial set-up of a mobile device comprising:
    receiving, user input information to a mobile device comprising a trusted security zone;
    hashing, the user input information with a trusted security zone master key to generate a user specific trusted security zone key, wherein the hashing process is completed by a set-up application on the mobile device;
    communicating, the user input information to a trusted service manager, wherein the trusted service manager has access to the trusted security zone master key and the trusted service manager completes a similar hashing process to generate the user specific trusted security zone key;
    verifying, the user specific trusted security zone key between the mobile device and the trusted service manager, wherein the mobile device and the trusted service manager communicate via a service provider network;
    using, the user specific trusted security zone key to operate one or more secure applications executed in the trusted security zone on the mobile device; and
    returning, the mobile device to factory settings, wherein the method is repeated after the mobile device has been returned to factory settings and a second user specific trusted security zone key is generated.

9. The method of claim 8, wherein the mobile device has been returned to factory settings because a first user of the mobile device is experiencing problems with the device.

10. The method of claim 8, wherein the mobile device has been returned to factory settings because a second user wishes to use the mobile device.

11. The method of claim 8, wherein the trusted service manager is identified and identification information is stored on the mobile device.

12. A method for creating a user specific trusted security zone key for use on a mobile device comprising:
    receiving, a first user input information via a mobile device in communication with a network server, wherein the mobile device comprises a trusted security zone;

generating, a first user specific trusted security zone key by hashing the first user input information with a trusted security zone master key, wherein the hashing process is completed by an application on the network server;

using, the first user specific trusted security zone key to operate secure applications executed in the trusted security zone of the mobile device;

returning, the mobile device to factory settings;

after returning the mobile device to factory settings, receiving a second user input information via the mobile device in communication with the network server;

generating, a second user specific trusted security zone key by hashing the second user input information with the trusted security zone master key, wherein the hashing process is completed by an application on the network server; and using, the second user specific trusted security zone key to operate secure applications executed in the trusted security zone of the mobile device.

13. The method of claim 12, wherein the second user specific trusted security zone key is used by a second user of the mobile device to operate secure applications executed in the trusted security zone.

* * * * *